United States Patent [19]
Sato

[11] Patent Number: 5,359,707
[45] Date of Patent: Oct. 25, 1994

[54] DOCUMENT PROCESSOR HAVING A PROGRAMMABLE DICTIONARY

[75] Inventor: Yumi Sato, Saitama, Japan

[73] Assignee: Fuji Xerox Co., Ltd., Tokyo, Japan

[21] Appl. No.: 200,558

[22] Filed: Feb. 22, 1994

Related U.S. Application Data

[63] Continuation of Ser. No. 594,064, Oct. 10, 1990, abandoned.

[51] Int. Cl.⁵ .............................................. G06F 15/62
[52] U.S. Cl. .................. 395/145; 364/419.14; 395/157
[58] Field of Search ............ 364/419.14; 395/145, 395/157, 146

[56] References Cited

U.S. PATENT DOCUMENTS

| | | | |
|---|---|---|---|
| 4,797,855 | 1/1989 | Duncan, IV et al. | 364/900 |
| 4,847,766 | 7/1989 | McRae et al. | 364/419 |
| 4,849,898 | 7/1989 | Adi | 364/419 |
| 4,982,344 | 1/1991 | Jordan | 364/521 |
| 5,060,154 | 10/1991 | Duncan, IV | 364/419 |

OTHER PUBLICATIONS

Baumgarten et al, *Using Word Perfect 5.1*, 1989, pp. 183-214.

*Primary Examiner*—Heather R. Herndon
*Assistant Examiner*—Joe Feild
*Attorney, Agent, or Firm*—Finnegan, Henderson, Farabow, Garrett & Dunner

[57] ABSTRACT

A document processor which advantageously provides usage information for words includes a first memory for storing a document to be elaborated, the document including first word data, a second memory for storing a dictionary including second word data and usage data associated with the second word data, and a third memory for temporarily storing a list of third word data which are not to be elaborated. A controller sequentially retrieves the first word data included in the first memory, sequentially compares the first word data with the second word data and the third word data, and selects individual word data for elaboration from the first word data which coincides with the second word data and which does not coincide with the third word data.

6 Claims, 7 Drawing Sheets

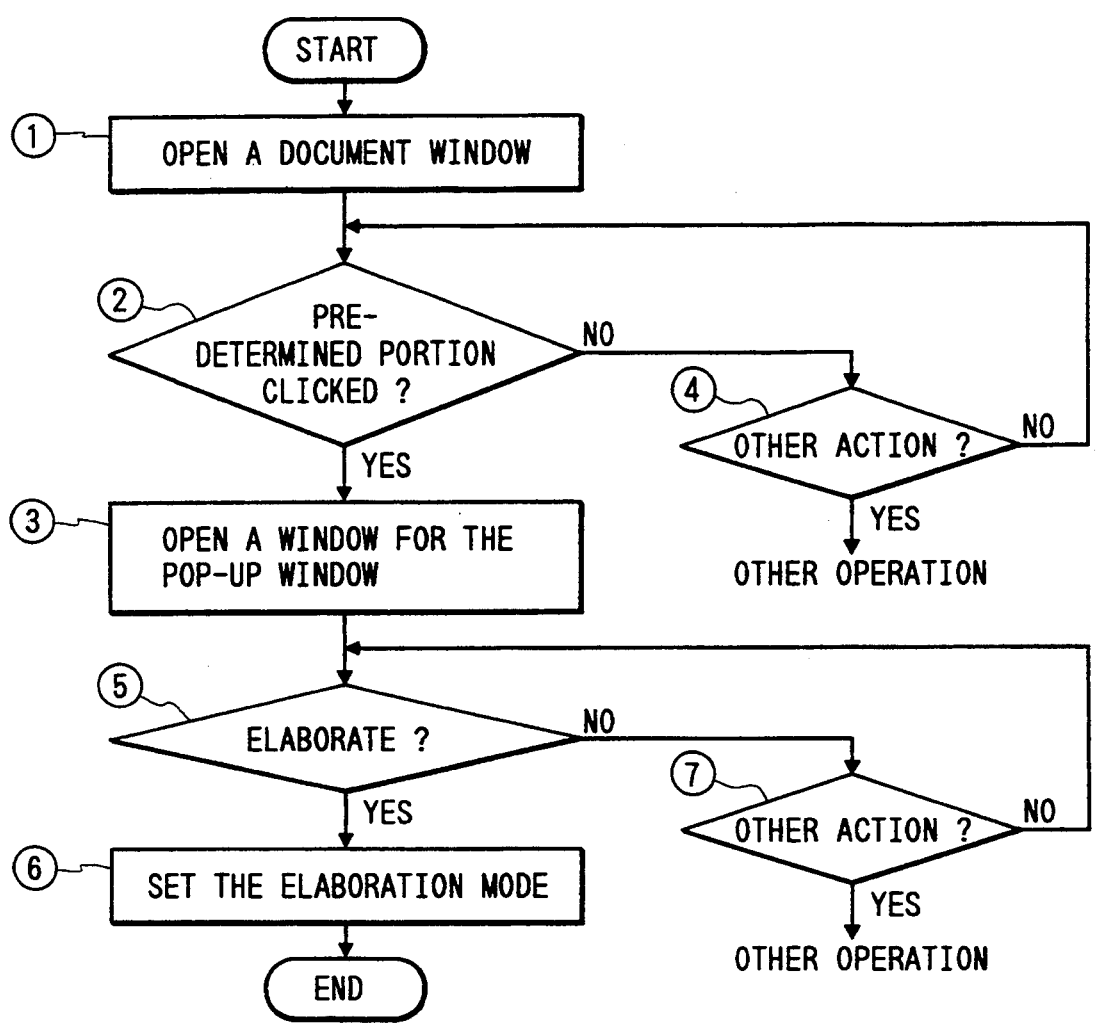

| 32 { | あいえん | | あいしゅう | | あいしょう | | | |
|---|---|---|---|---|---|---|---|---|
| 33 { | 愛煙 | 合縁 | 哀愁 | 愛執 | 相性 | 哀傷 | 愛妾 | 愛称 |
| 34 { | 1 | 1 | 1 | 1 | 1 | 1 | 1 | 1 |
| | 0 | 1 | 1 | 1 | 0 | 1 | 1 | 0 |
| | 0 | 1 | 0 | 1 | 1 | 0 | 1 | 0 |
| | 1 | 0 | 1 | 1 | 1 | 1 | 1 | 0 |
| | 1 | 0 | 0 | 1 | 0 | 0 | 1 | 0 |
| | 1 | 1 | 1 | 1 | 1 | 1 | 1 | 1 |
| | 1 | 1 | 1 | 1 | 1 | 1 | 1 | 1 |
| | 1 | 1 | 1 | 1 | 1 | 1 | 1 | 1 |
| 35 { | (USAGES) | | (USAGES) | | (USAGES) | | | |

DOCUMENT PROCESSOR HAVING A PROGRAMMABLE DICTIONARY

This application is a continuation of application Ser. No. 07/594,0664, filed Oct. 10, 1990, now abandoned.

BACKGROUND OF THE INVENTION

1. Field of the Invention

The present invention relates to a document processor capable of elaborating on words in a previously prepared document or a document presently being prepared, and more particularly to a document processor which checks the proper usage of homonyns which are likely to be mistaken.

2. Discussion of the Related Art

The widespread use of document processors, such as Japanese word processors and computers, simplifies the preparation and editing of documents at offices and in homes. In such document preparing and editing operations, various errors frequently occur, such as the operators, improper selection of homonyms, or in the case of Japanese word processors, where foreign borrowed words, which in Japanese should be expressed in katakana, are erroneously converted to kanji. Briefly, katakana is a Japanese writing style wherein each Japanese character represents phonetically a vocal sound corresponding to a part of a Japanese word. Kanji is a Japanese writing style wherein each Japanese character represents an entire word or idea. For instance, in the case where the correct phrase should be "山に登る (climb a mountain)," the phrase is erroneously written as "山に昇る (rise a mountain)," or in the case where the correct phrase should be "音とライト (sound and light)," the phrase is converted to such as "音渡来と".

Conventionally, there are document processors that are adapted to check the meanings and examples of words and phrases that are likely to result in input errors, by means of an electronic dictionary incorporated in the apparatus. Such an apparatus display a prepared document on a display screen and a questionable portion is highlighted with a cursor, or doubtful words and phrases may be input by the user through a keyboard and then their meanings and examples of use are displayed on the display screen.

With such apparatus, however, the following problems have been encountered. It is necessary to designate doubtful words and phrases by the cursor, or inputting them through the keyboard. Even if an electronic dictionary exists, it is troublesome and time consuming to refer to the dictionary, and it has been impossible to check the documents with ease.

As a general rule, whether or not the word or phrase concerned is correct is finally determined by the person who prepared the document. Hence, if the person who prepared the document believed the incorrect words or phrases to be correct, he is unable to accurately correct the document. Of course, it has conventionally been recommended to have a person different from the person who prepared the document to check it in order to eliminate such a drawback. However, it is necessary to assign a plurality of personnel for the operations of preparing and checking documents, and this arrangement does not teach the person preparing the documents his errors. In addition, this arrangement is disadvantageous in terms of high personnel costs and low work efficiency.

Although a description has been given above of doubtful words and phrases, in cases where more appropriate words or phrases exist than the words or phrases input, there has been the problem that a change cannot easily be made to such words or phrases, insofar as the person who prepared the document may not be aware of the existence of more appropriate words or phrases.

SUMMARY OF THE INVENTION

The present invention has been made in view of the above circumstances and has a primary object to provide a document processor which allows a usage dictionary to be commonly used by several operators and is capable of subjecting only necessary words or phrases to elaboration.

A second object of the present invention is to provide a document processor capable of clearing in predetermined cases information concerning words or phrases for which elaboration is not required.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the image processor in accordance with a first aspect of the invention comprises: a dictionary for elaboration accommodating therein words and phrases and their usages for elaborating the text of a document; temporary registering means for temporarily registering words or phrases for which elaboration of the text is not required; and retrieving means for sequentially retrieving the words and phrases stored in the dictionary for elaboration and not registered by the temporary registering means In accordance with the first aspect of the invention, temporary registering means for temporarily registering words and phrases for which elaboration is not required is provided, so that the words and phrases for which the operator has determined that their elaboration is not required can be discriminated without changing the dictionary, thereby attaining the above-described primary object of the invention.

In accordance with a second aspect of the invention, the image processor comprises: window displaying means for displaying the text of a document subject to elaboration in a window; a dictionary for elaboration accommodating therein words and phrases and their usages for elaborating the text; temporary registering means for temporarily registering words or phrases for which elaboration of the text is not required; retrieving means for retrieving the words and phrases stored in the dictionary for elaboration and not registered by the temporary registering means in the text displayed by the displaying means; a window for elaboration for displaying a result of retrieval by the retrieving means; instructing means for instructing the opening and closing of the window for elaboration; and canceling means for canceling the corresponding contents registered in the temporary registering means when the opening of the window is instructed by the instructing means.

In other words, in accordance with the second aspect of the invention, at the time when the window for elaboration is opened, the contents registered in the temporary registering means concerning that window are canceled, whereby elaboration is commenced with the contents of an initialized dictionary for elaboration, thereby attaining the above-described second object of the invention.

The following drawings, which are incorporated in and constitute a part of this specification, illustrate an embodiment of the invention and, together with the description, serve to explain the objects, advantages and principles of the invention.

BRIEF DESCRIPTION OF THE DRAWINGS

FIG. 2 is a flowchart illustrating the operation of the document processor for selecting the elaborating mode;

DETAILED DESCRIPTION OF THE PREFERRED EMBODIMENT

In view of the above described difficulties accompanying prior art or conventional apparatus, the present inventor has proposed, in Japanese patent application No. 56468/1990 which has been not yet published, a document processor comprising: document displaying means, such as a CRT, for displaying a prepared document; a usage dictionary prepared for each individual by collecting words and phrases and their usages that are likely to be mistaken in the preparation of a document; retrieving means for retrieving words and phrases in the document by using the usage dictionary; usage selecting means for selecting whether the display of usages concerning the words and phrases retrieved is required; and dictionary correcting means for deleting a relevant word or phrase from the usage dictionary when the display of the usage is not required.

Figures 6, 8:
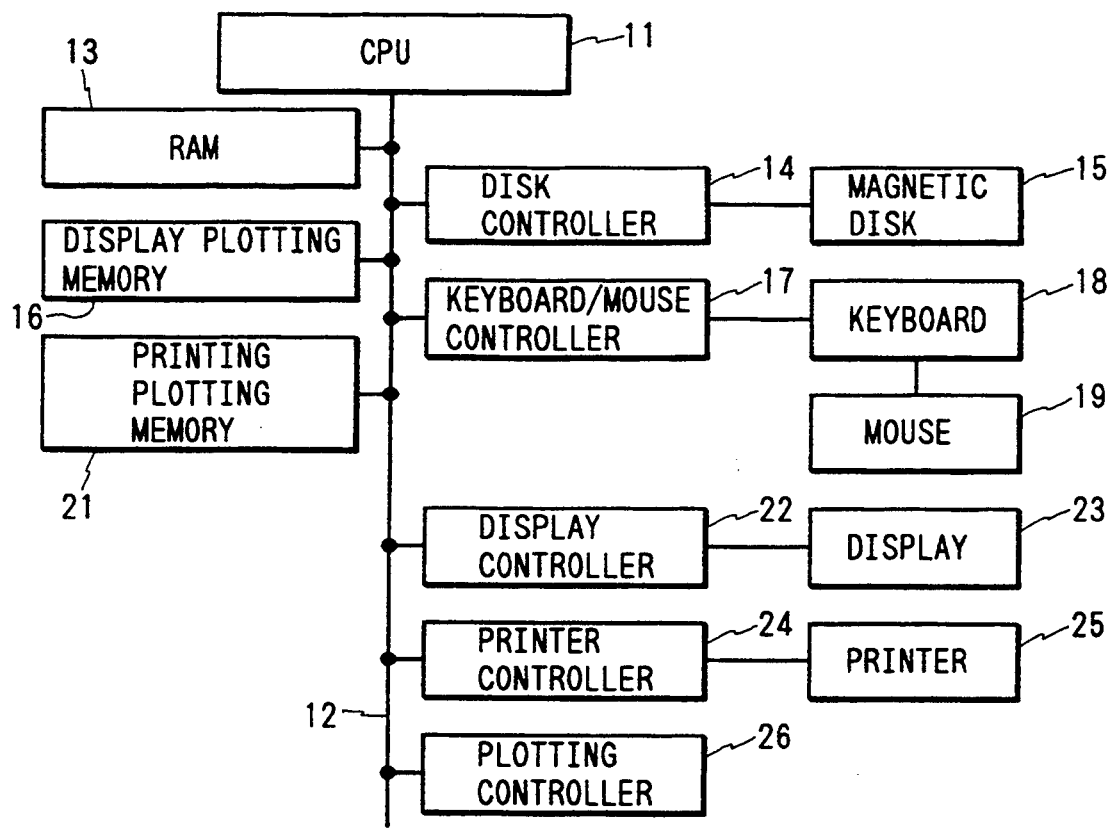
FIG. 6 is a block diagram illustrating a circuit configuration of a conventional document processor.
FIG. 8 is a diagram illustrating a part of the contents of a dictionary used in the conventional document processor.

FIG. 6 illustrates a circuit configuration of this document processor.

This document processor has a CPU 11 connected to the following components via a data bus 12:

A random access memory, RAM 13, for storing a program for controlling the document processor and storing temporary data;

A disk controller 14 for controlling disk input/output, such as reading a program stored in a magnetic disk 15 and storing it in the RAM 13, reading a document and the dictionary that are stored in the magnetic disk 15, or storing the dictionary and a prepared or corrected document in the RAM 13;

A display plotting memory 16 for developing an image for display;

A keyboard/mouse controller 17 for controlling data input through a keyboard 18 and a mouse 19 and transmitting the data to the bus 12;

A printing plotting memory 21 for developing an image for printing;

A display controller 22 for controlling the plotting of an image on a display 23;

A printer controller 24 for controlling various mechanical movements, such as paper feeding in a printer 25; and A plotting controller 26 for controlling the plotting of image information printed by the printer 25.

Figure 7:
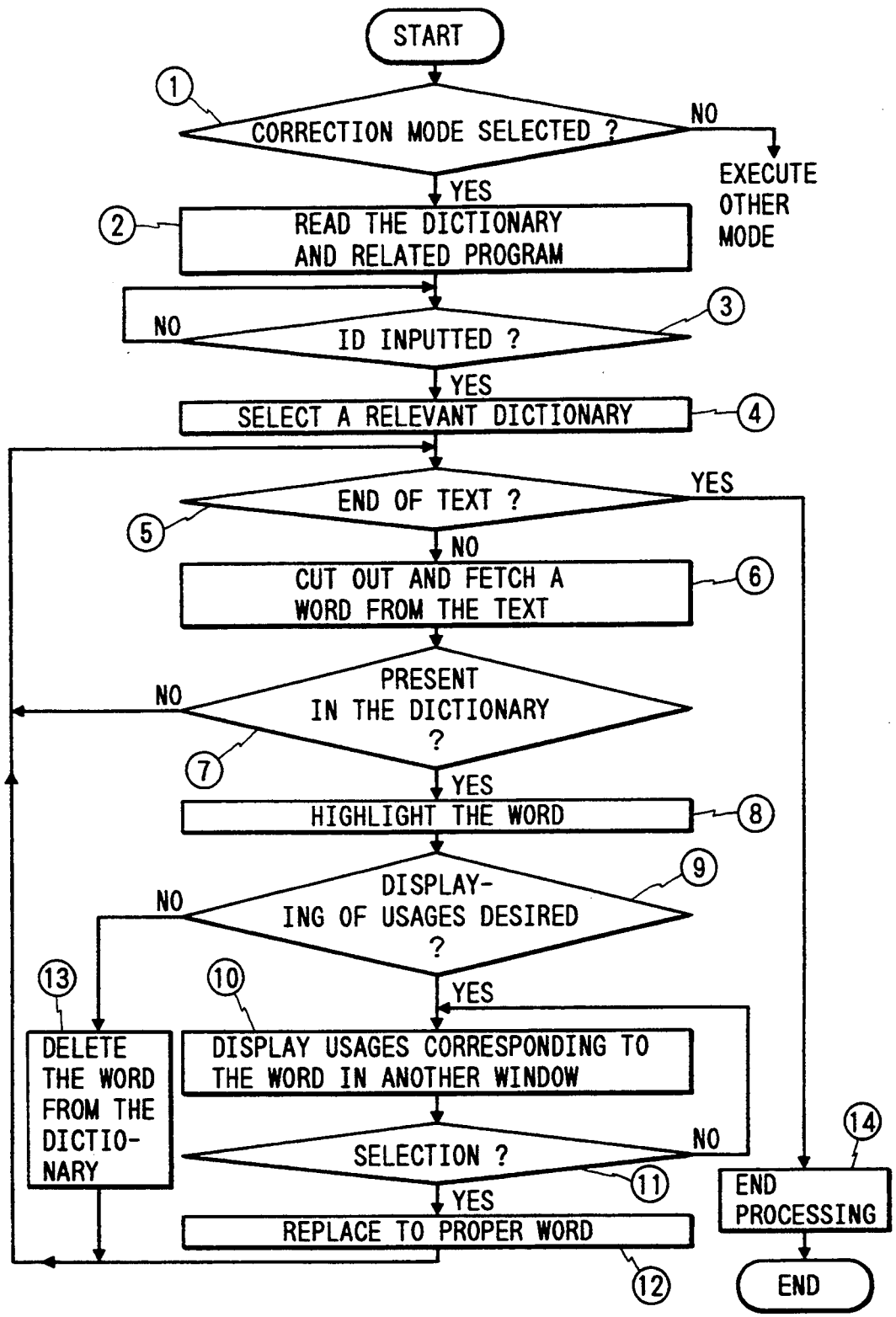
FIG. 7 is a flowchart illustrating the operation case where a document correction mode is selected in the conventional document processor.

FIG. 7 illustrates the processing operation of document processor. First, the user operates the keyboard 18 to put the document processor in the correction mode for correcting a document (Step 1 in FIG. 7). When a mode other than the correction mode has been selected (N), that designated mode is executed. If the correction mode is selected (Y), a dictionary and a program for controlling the correction are read from the magnetic disk 15 and stored in the RAM 13 (Step 2). Subsequently, if the operator inputs an ID (identification information) assigned to the operator (Step 3; Y), a new dictionary corresponding to the operators, ID is read from the disk 15 and stored in the RAM 13.

FIG. 8 illustrates a part of a dictionary. A dictionary 31 is arranged such that words and phrases 33 expressed in kanji, such as "愛 煙" and "合 緣", and katakana are arranged below a phonetic section 32 partitioned by the phonetic representation of the word, such as "あいえん". Further, with eight operators assigned to the system, for example, a section is provided for the requirement/non-requirement information 34 with respect to eight IDs for these words and phrases. Here, the number "1" represents that the system is required to check the word or phrase for the operator having the ID, while the number "0" represents that the system is not required to check the word or phrase for that particular operator. Of these IDs, the one in the uppermost row is always set to "1" with respect to all the words because this ID is used when it is necessary to conduct a check with respect to all the words. The signals "1" and "0" are mixed in the second to fifth rows because the operators associated with these rows have previously set the requirement/non-requirement status of each word of phrase separately at the time of use. The reason why all the IDs in the sixth row and thereafter are set to "1" is because these IDs have not yet been used. All the unused IDs are set by default to "1".

Information 35 relating to the proper usage of each word is stored below the requirement/non-requirement information 34 corresponding to the phonetic section 32. This usage information 35 is displayed when the phonetic section 32 is accessed. However, in order to access the phonetic section 32, it is necessary that the number corresponding to the ID inputted with respect to the relevant word being displayed be "1". If an explanation is given of "あいしゅう" in the phonetic section shown in FIG. 8, the ID in the second row is set to "1" for both "哀 愁" and "愛 執", so that in cases where either of these words has been written, the proper steps for checking and display of the usage are implemented. In contrast, the ID in the third row is set to "0" with respect to "哀愁", in cases where this word has been written in the document, the usage information is not displayed with respect to "あいしゅう". The number "0" is set when the operator of that ID has a clear understanding of the word " 哀愁 ", and it is therefore unnecessary for him or her to check it, as will be described later.

On the other hand, if this operator has used the word " 愛執 " in the text, since the signal concerning this word has been set to "1", this word is checked, and the proper usage, if requested by the operator, is displayed.

Referring back to FIG. 7, if the operator inputs an ID, a relevant portion of the ID in the requirement/non-requirement information 34 is thereafter used in the checking operation. In this state, the CPU 11 (see FIG. 6) determines whether or not processing has been completed for the text (Step 5). If it has not been completed (N), a word is cut out and retrieved from the text, and it is determined whether or not the cut-out word corresponds to number "1" of the corresponding ID in the dictionary shown in FIG. 8 (Step 7). If correspondence exists, the word is highlighted (Step 8).

Figure 9:
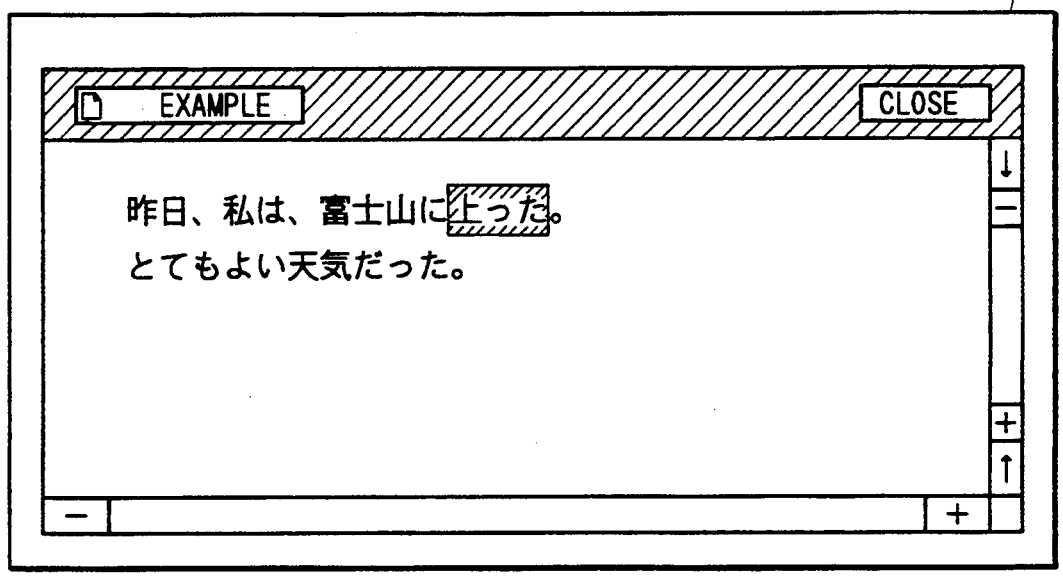
FIG. 9 is a plan view illustrating a display window of the display of the conventional document processor.

FIG. 9 shows an example of highlighting. The basic form " エ ろ " of the word " エ っ た " in the text displayed in a window 23A is retrieved by the dictionary. If the requirement/non-requirement number 34 concerning the ID of this portion of text was "1", " エ っ た " is highlighted.

Then, the operator inputs whether he desires the usage to be displayed (Step 9). In other words, if the use of " エ っ た " is doubtful, he or she gives an instruction for displaying the usage, and if it is not doubtful, he or she gives an instruction for not displaying it. If the instruction for displaying the usage has been given (Y), the usage corresponding to that word is displayed in another window in the display 23 (Step 10).

Figure 10:
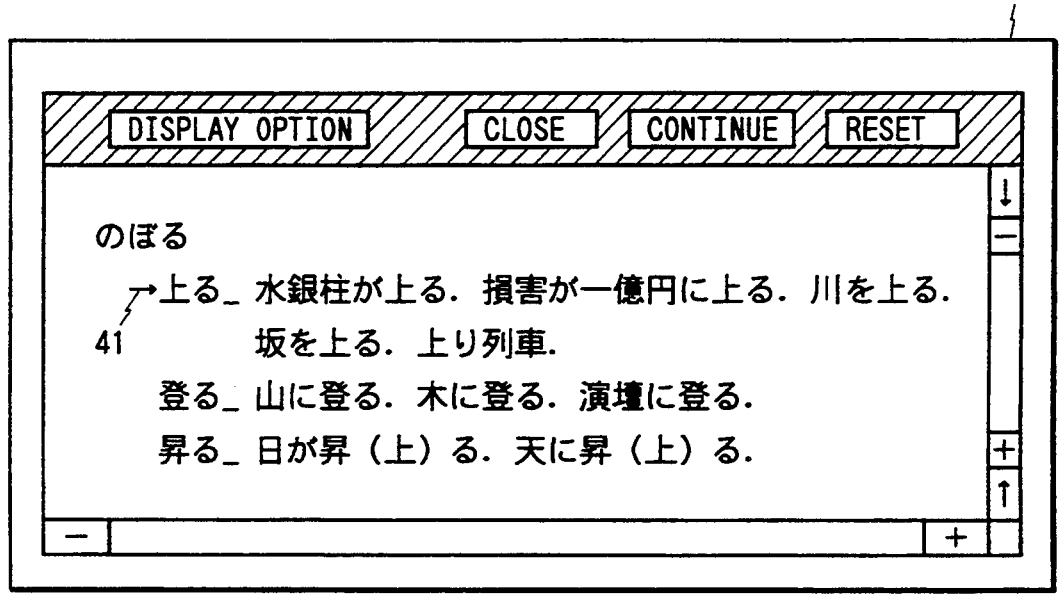
FIG. 10 is a plan view illustrating the display window for in the display of the conventional document processor.

FIG. 10 illustrates the displayed contents of the window. With respect to the basic form " のほる ", words that are likely to be mistaken and their usages, together with meanings, if necessary, are displayed in a window 23B. Here " エ ろ " which is the basic form of the word " エ っ た " used by the operator is displayed as the first word, and this portion is initially indicated by a cursor 41. By looking at the usages and the like, the operator determines whether or not the expression " エ ろ " is appropriate. For instance, if he or she thinks that, the word " 昇る " is appropriate, he or she moves the cursor 41 to its position, and presses a selection key on the keyboard 18 or a selection switch of the mouse 19 (neither are shown). If selection of any of the words is performed (Step 11; Y), the proper correction is made (Step 12). In this case, the replacement is carried out by converting the word in the basic form to an inflected form in the text. Subsequently, the operation returns to Step 5, and if there still remains a portion to be checked in the document, similar processing is continued with respect to the next word.

Meanwhile, if the display of usages is not desired in Step 9 (N), it follows that the operator has no problem in using the relevant word. Accordingly, relevant word is deleted from the dictionary (Step 13). Specifically, the requirement/non-requirement information 34 concerning the ID of this portion is changed from "1" to "0". As a result, for the same ID, the check of that word is not subsequently carried out, the reducing unnecessary operations. After the dictionary is updated, the operation returns to Step 5, and if there still remains a portion to be checked in the document, similar processing is continued with respect to the next word. Then, when there is finally no more text to be checked in the document (Step 5; Y), various end processing steps are executed, such as replacing relevant dictionary with the updated dictionary in the disk 15 (Step 14), thereby completing the entire processing (End).

However, this conventional document processor proposed by the present inventor had the following drawback.

Since a usage dictionary was prepared for each individual, there has been a problem in that if the number of persons undertaking the elaboration of documents increases, or if the numbers of words and phrases to be elaborated and usages contained increase, large-capacity memory is required for these dictionaries. Therefore, it was conceived to introduce a usage dictionary for con, non use by numerous people. However, if this measure is adopted, there is a drawback in that if a certain person deletes unnecessary portions by using the usage dictionary, necessary words and phrases may eliminated from use by other people. Referring now to the accompanying drawings, a detailed description will be given of a preferred embodiment of the present invention.

Figure 1:
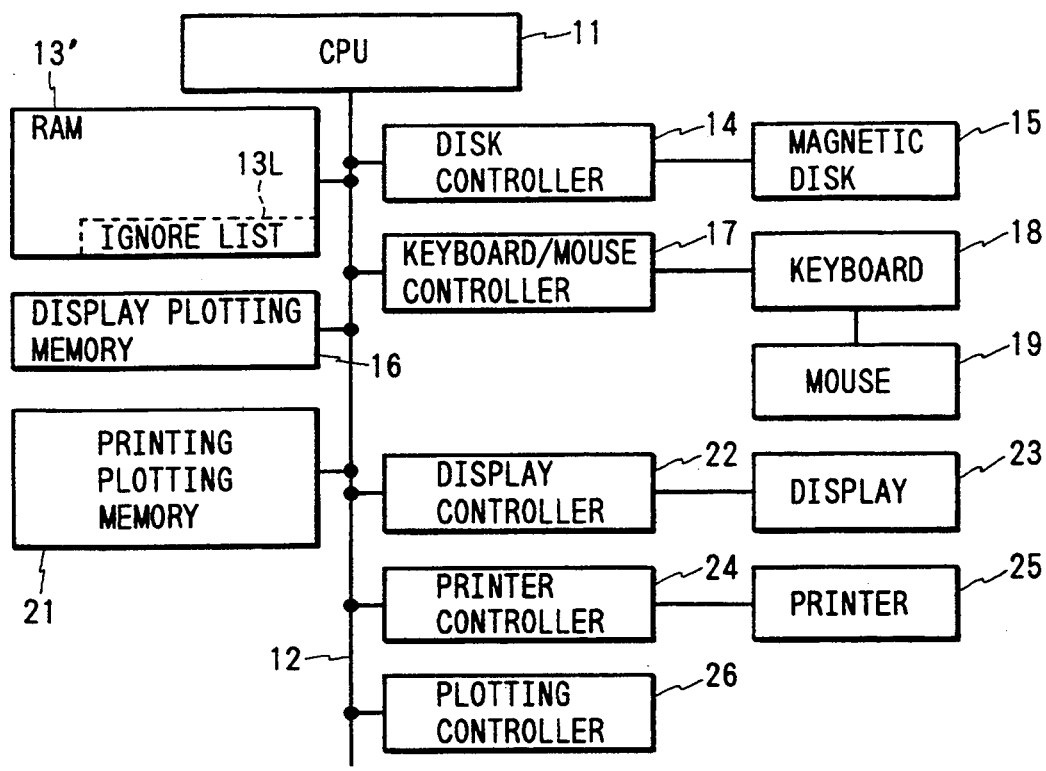
FIG. 1 is a block diagram illustrating a circuit configuration of a document processor.

FIG. 1 illustrates an outline of a circuit configuration of a document processor in accordance with an embodiment of the present invention. Those components that are identical with those of FIG. 6 are denoted by the same reference numerals, and a description thereof will be omitted.

In the document processor of this embodiment, an ignore-list registering area 13L is provided in a predetermined area inside a RAM 13'. A program for controlling the document processor of this embodiment, as well as other data, is stored in a magnetic disk 15. When the document processor is started, the contents of the program are transferred to the RAM 13', and control of the document processor implemented accordingly.

FIG. 2 illustrates the operation of the document processor up to the time that the document processor is set in the elaboration mode. When the operator selects a desired icon displayed initially on a display 23, a document window is opened (Step 1 in FIG. 2). Then, if the operator clicks a predetermined portion of the document window (Step 2; Y), a window for a pop-up menu is opened (Step 3). If the operator engages in another action other than opening the pop-up menu such as editing a document, for example, (Step 4; Y), a corresponding operation is performed.

If the pop-up menu is opened in Step 3, the operator may designate a desired item among the items of the menu. If the operator designates the item "Elaborate" by the mouse 19 (Step 5; Y), the document processor is placed in the elaboration mode for elaborating the document being displayed in the window (Step 6). On the other hand, if another item is selected (Step 7; Y), the document processor is placed in the mode for executing the designated item.

Figure 3:
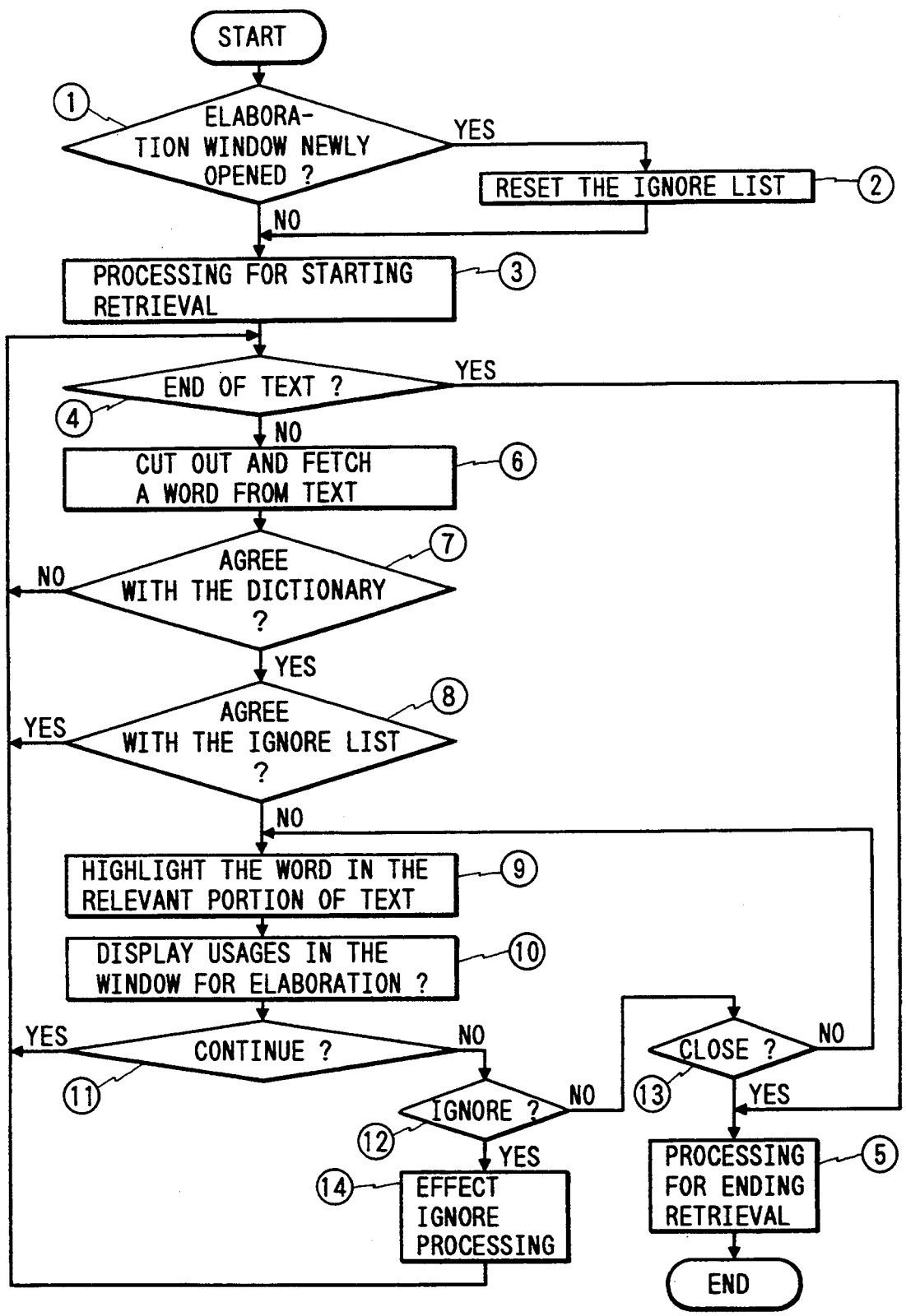
FIG. 3 is a flowchart illustrating the control of the document processor in the elaboration mode.

FIG. 3 illustrates the control of the document processor in the elaboration mode.

In this elaboration mode, a check is made as to whether or not the window for elaboration has been opened (Step 1 in FIG. 3). If this window has been newly opened, the ignore list registered in the ignore-list registering area 13L inside the RAM 13' is reset (Step 2). Subsequently, retrieval of a dictionary for elaboration is begun (Step 3). If the window has not been newly opened, the operation proceeds immediately to Step 3.

If the retrieval in Step 3 has begun, a check is made as to whether or not the portion currently being retrieved is the end of the text in the window (Step 4). If processing has progressed to the end of the text (Y), predetermined processing for ending the retrieval is carried out (Step 5), thereby ending the processing (End).

If the retrieval processing for elaboration has not been completed (Step 4; N), a word is cut out and fetched from the text (Step 6). Then, a determination is made as to whether or not the cut-out word coincides with any of the words in the elaboration dictionary (Step 7). If no coincidence occurs, another word is cut out and fetched (Step 6), and a comparison is made with the elaboration dictionary in the same manner (Step 7).

Assuming a coincidence occurs, the process continues and a check is then made as to whether or not the cutout word coincides with the words in the ignore list (Step 8). If the cut out word coincides with a word in the ignore list, this signifies that the operator should ignore elaboration of that word, so that the operation returns to Step 4 to commence elaboration on the next word. In other words, in this case, the result of elaboration is not displayed on the display 23.

On the other hand, if no coincidence occurs between the cut out word and the ignore list in Step 8 (N), that word is subject to elaboration, and needs to be displayed to the operator. Accordingly, in that case, the word in the relevant portion of the text is highlighted in the document window (Step 9). In the example of "の はず" given above, the word "は, た" is highlighted as the result of retrieval, as shown in FIG. 9. In this case, the various usage of "の はず" are displayed in the window for elaboration (Step 10).

Figure 4:
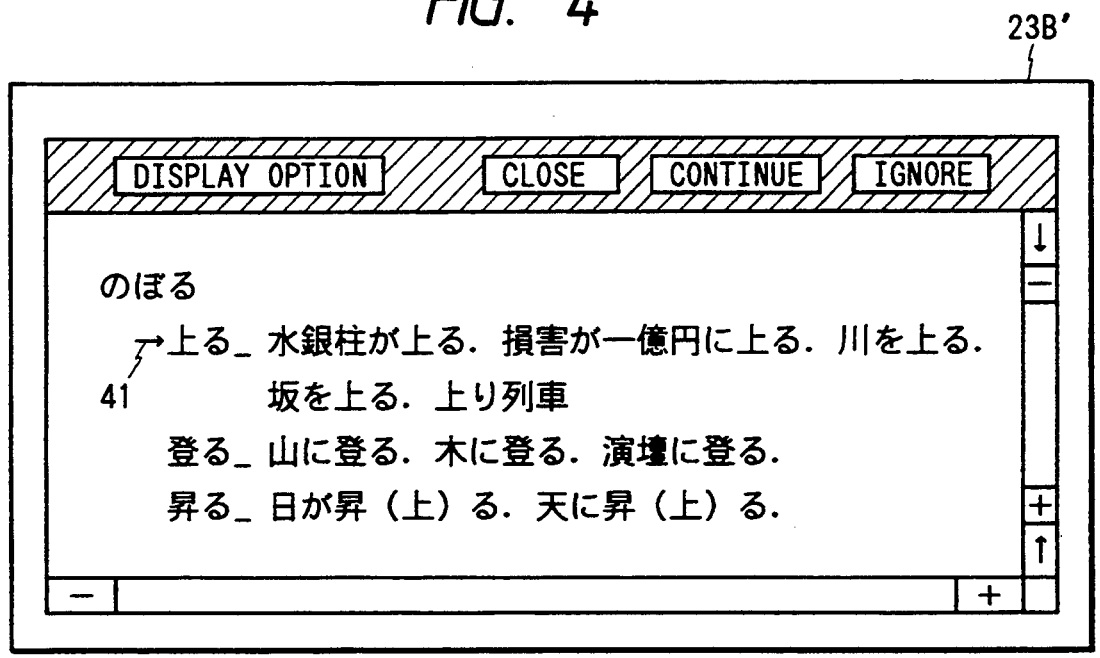
FIG. 4 is a plan view illustrating an example of the displayed contents of a window in the elaboration mode.

FIG. 4 illustrates the displayed contents of this window for elaboration. The displayed contents of this window 23B' for elaboration are similar to the window 23B shogun in FIG. 10, but a new command "Ignore" is displayed in the upper frame of the window. The "Close" and "Continue" are similar to those shown in FIG. 10, but the "Continue" command appears as the "Start" command because the window 23B' is newly opened. By clicking the "Start" command, retrieval is initiated. This is also true for the window 23B shown in FIG. 10.

The description will continue by referring back to FIG. 3. When usages are displayed in the window 23B for elaboration in Step 10, the operator selects any one of the "Continue", "Ignore", and "Close" commands by operating the mouse 19 (Steps 11–13).

When the "Continue" command is selected (Step 11; Y), elaboration is continued. Accordingly, in that case, the operation returns to continue the elaboration.

When the "Ignore" command is selected (Step 12; Y), the operator does not wish to elaborate the same word thereafter, so that processing prevents highlighting of that word and the displaying of usages (Step 14). Subsequently, the control operation returns to Step 4.

When the "Close" command is selected (Step 13; Y), the operation proceeds to Step 5 to initiate processing to end the retrieval, thereby completing the processing (End).

Figure 5:
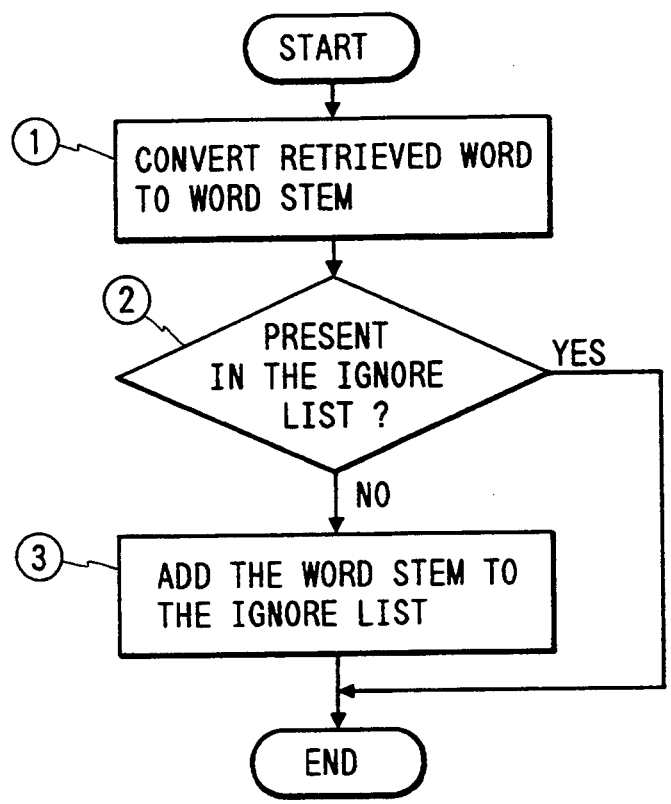
FIG. 5 is a flowchart illustrating the registering of an ignore list.

FIG. 5 specifically illustrates the registering process for the ignore list. During the registering of the ignore list, the retrieved word is first converted to a word stem (Step 1 in FIG. 5). For instance, the word " は, た " is converted to the word " は ". This is because " は る ", its inflected form " は, た ", and the like, are treated similarly in the ignore list. After conversion to the word stem, a check is conducted as to whether or not the word stem exists in the ignore list (Step 2). If it is not present in the ignore list (N), that word stem is added to the ignore list thereby assuming it is unnecessary for the operator to confirm that word stem again (Step 3).

If it is determined in Step 2 that the same word stem exists in the ignore list, the word stem is not added to the ignore list to avoid overlapping registration.

Since the contents of the ignore list are reset if the window 23B' for elaboration is closed and opened again, the operator may begin the elaborating operation with the contents of the dictionary for elaboration remaining intact.

It should be noted that although in the foregoing embodiment a description has been given of processing homonyms of the Japanese language, the present invention is applicable to the elaboration of various other types of documents, such as elaborating translations.

As described above, in accordance with a first aspect of the invention, since means for temporarily registering words or phrases for which elaboration is not required is provided, it is possible to efficiently conduct elaboration.

In addition, in accordance with a second aspect of the invention, since an arrangement is provided such that the registration of words and phrases for which elaboration is not required can be canceled in correspondence with the opening and closing of the window, there is an advantage in that when operators take turns in effecting the processing of different documents, elaboration can be effected without being affected by the writing ability and experience of the previous operator.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplate. It is intended that the scope of the invention be defined by the claims appended thereto, and their equivalents.

What is claimed is:

1. A document processor for Japanese language documents comprising:

document storage means for storing a document;

first window display means for displaying text of the document in a first window, said text of said document including first word data;

memory means for storing a dictionary including second word data representing Japanese words and characters designating said words, and usage data associated with said second word data, the usage data representing multiple characters and definitions for each of the Japanese words and for Japanese homonyms of each of the Japanese words;

temporary registering means for temporarily storing a list of third word data;

control means for sequentially retrieving said first word data included in said document storage means, for sequentially comparing said retrieved first word data with said second word data and said third word data, and for selecting individual word data from said first word data which coincides with said second word data and which does not coincide with said third word data;

second window display means for displaying in a second window said individual word data selected by said control means;

window control means for opening and closing said second window; and cancelling means for automatically restoring, when said second window is closed, said temporary registering means to a state corresponding to the state existing when said window control means opens said second window.

2. The document processor of claim 1, wherein said second display means further displays usage data associated with said individual word data selected by said control means.

3. The document processor of claim 1, including means for updating said list of third word data during the comparison of the first word data with the second word data to remove individual word data from said temporary registering means.

4. The document processor of claim 1, wherein said list of third word data contains a plurality of sublists of third word data, each sublist associated with an individual user of said document processor.

5. The document processor of claim 1, wherein said first word data, said second word data, and said third word data include words and phrases of words.

6. A document processor for Japanese language documents, comprising:

first memory means for storing a document, the document including first word data;

second memory means for storing a dictionary including second word data representing Japanese words and characters designating said words, and usage data associated with said second word data, the usage data representing multiple characters and definitions for each of the Japanese words;

temporary registering means for temporarily storing a list of third word data;

control means for sequentially retrieving the first word data from the first memory means, for sequentially comparing the retrieved first word data with the second word data and the third word data, and for selecting individual word data from the first word data which coincides with the second word data and which does not coincide with the third word data;

display means for displaying simultaneously the Japanese characters represented by the word data selected by said control means, and coincident characters and definitions represented by said second word data;

means for updating the list of third word data in the temporary registering means during the comparison of the first word data with the second word data and the third word data; and means for automatically erasing the third word data from the temporary registering means upon deactivation of the control means.

* * * * *

UNITED STATES PATENT AND TRADEMARK OFFICE
CERTIFICATE OF CORRECTION

PATENT NO. : 5,359,707
DATED : October 25, 1994
INVENTOR(S) : Yumi Sato

It is certified that error appears in the above-indentified patent and that said Letters Patent is hereby corrected as shown below:

On the title page, Item [63] Related U.S. Application Data, change "594,064" to --594,964--.

Signed and Sealed this

Thirtieth Day of May, 1995

Attest:

BRUCE LEHMAN

Attesting Officer     Commissioner of Patents and Trademarks